United States Patent [19]

Matthews

[11] Patent Number: 5,667,347

[45] Date of Patent: Sep. 16, 1997

[54] FASTENER

[76] Inventor: Norman Leslie Matthews, Level RJ, 1 Havelock Street, West Perth, 6006, W.A., Australia

[21] Appl. No.: 454,145

[22] PCT Filed: Dec. 10, 1993

[86] PCT No.: PCT/AU93/00638

§ 371 Date: Jul. 27, 1995

§ 102(e) Date: Jul. 27, 1995

[87] PCT Pub. No.: WO94/13964

PCT Pub. Date: Jun. 23, 1994

[30] Foreign Application Priority Data

Dec. 10, 1992 [AU] Australia .................................. PL6278
Jun. 28, 1993 [AU] Australia .................................. PL9824

[51] Int. Cl.[6] .............................. F16B 39/24; F16B 43/00
[52] U.S. Cl. .............................. 411/150; 411/11; 411/534; 411/544; 83/543
[58] Field of Search ........................ 411/6, 9–11, 150, 411/155, 156, 534, 544, 428, 917; 192/55.1, 56.1, 56.6; 83/543

[56] References Cited

U.S. PATENT DOCUMENTS

| | | | |
|---|---|---|---|
| 2,675,835 | 4/1954 | Kiekhaefer | 83/543 |
| 2,726,524 | 12/1955 | Gorin | 411/917 X |
| 4,006,661 | 2/1977 | Sims, Jr. | 411/11 |
| 4,362,449 | 12/1982 | Hlinsky | 411/534 X |
| 4,687,392 | 8/1987 | Bidwell | 411/6 |
| 4,776,442 | 10/1988 | Young | 192/55.1 |

*Primary Examiner*—Neill R. Wilson
*Attorney, Agent, or Firm*—Nixon & Vanderhye

[57] ABSTRACT

An improved fastener assembly is disclosed comprising a threaded fastener combined with two disc shaped washer components wherein one disc component is resilient and mounted to relatively rotate with respect to the threaded fastener and other disc component. A dry lubricant material is provided between the disc components to facilitate the relative rotation.

11 Claims, 3 Drawing Sheets

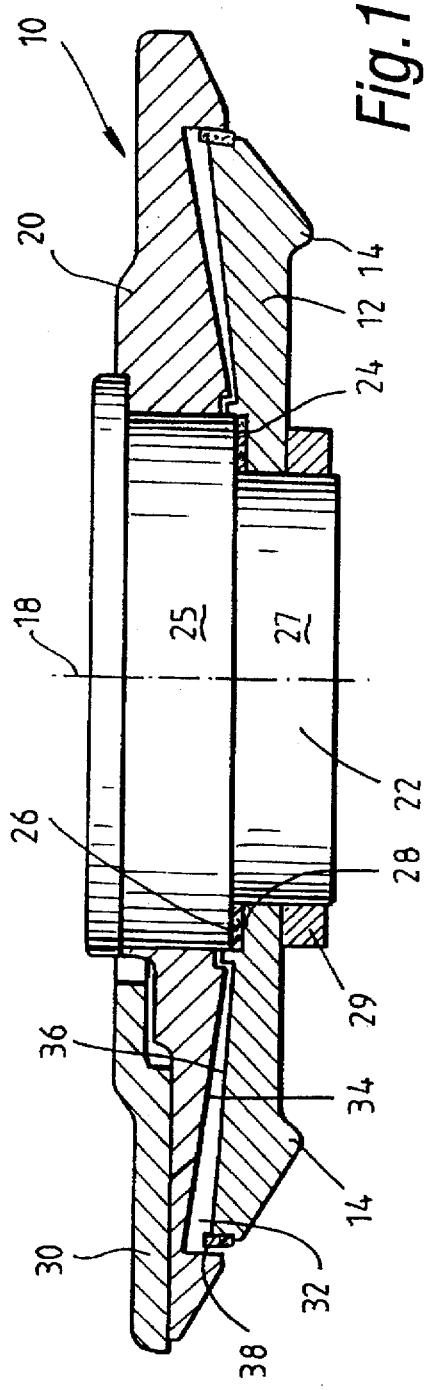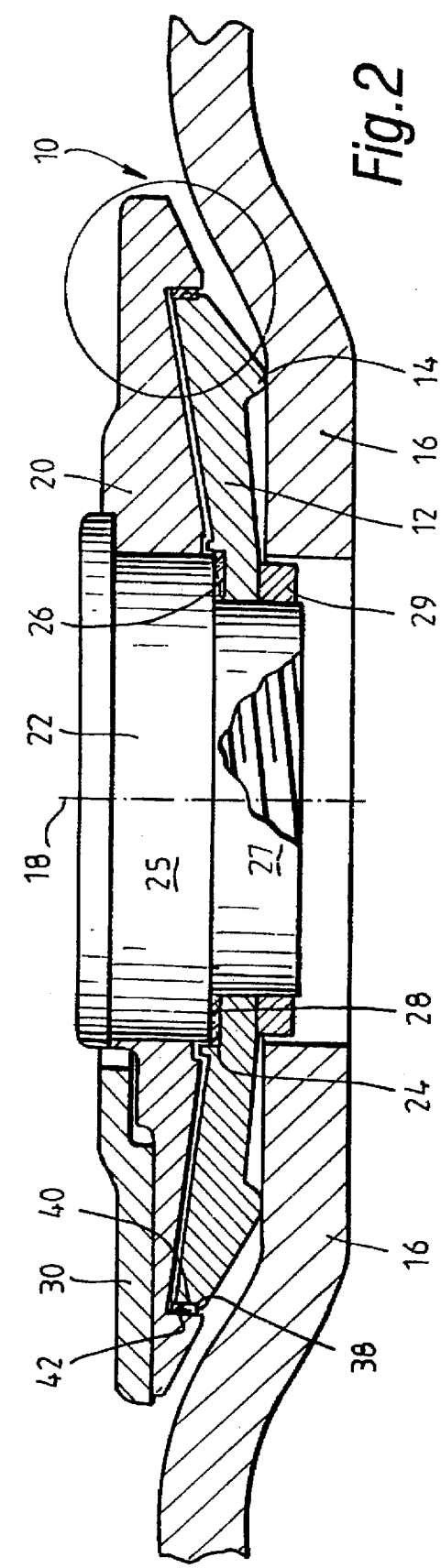

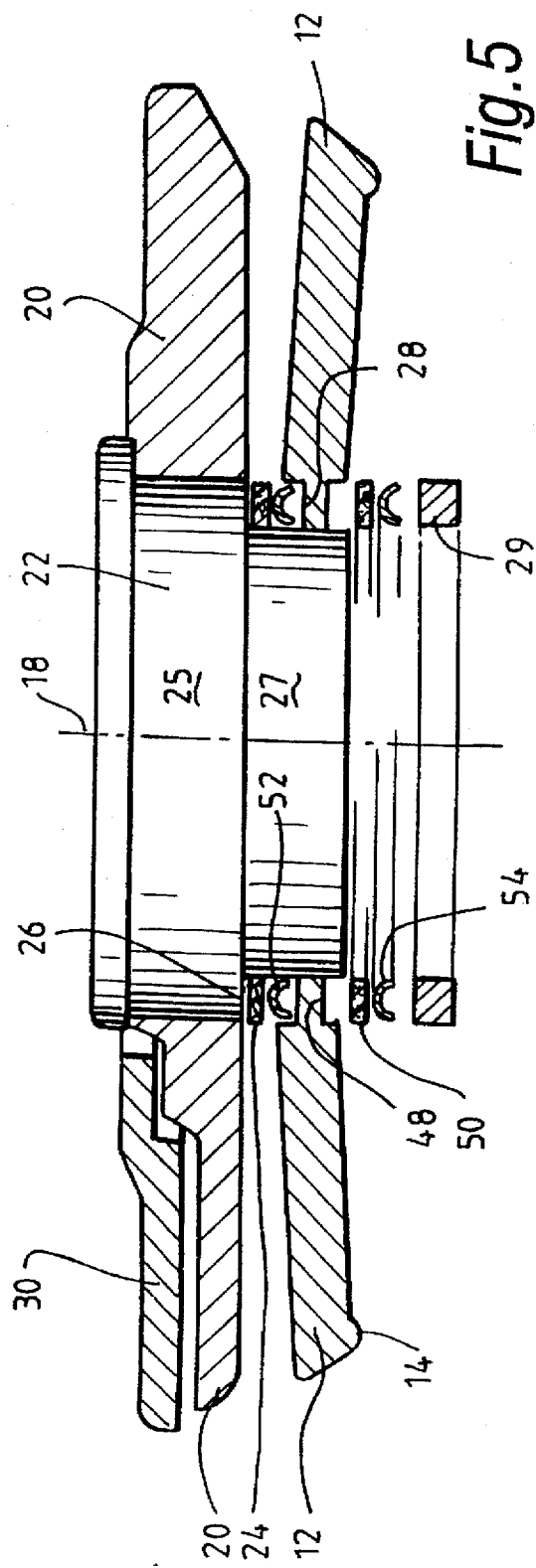
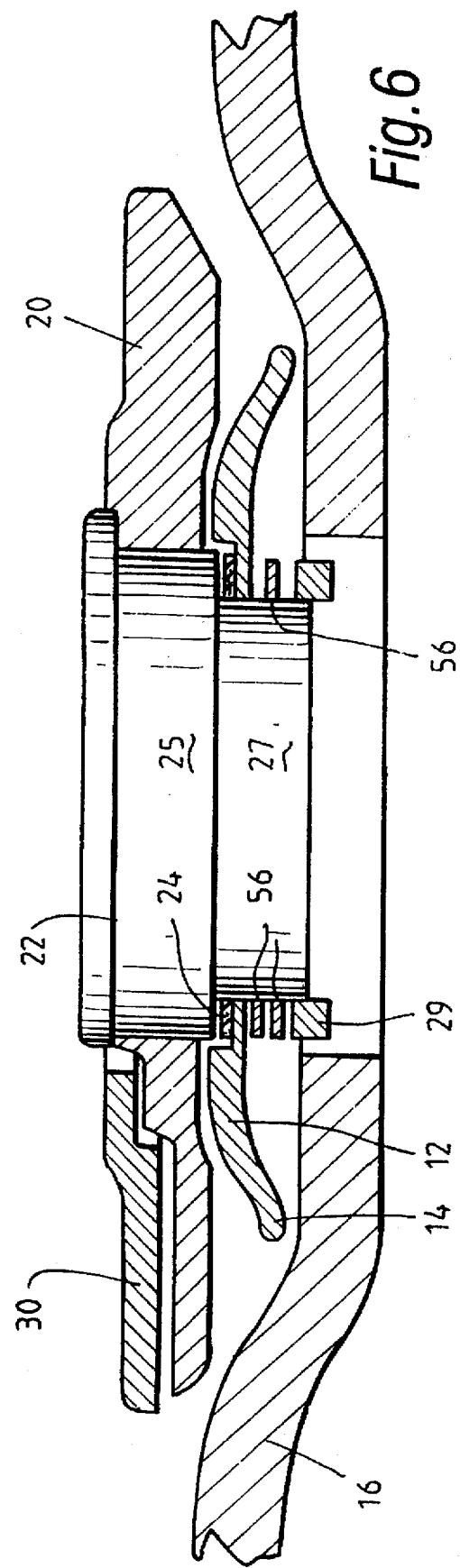

FASTENER

FIELD OF THE INVENTION

The present invention relates to improvements to a fastener, and relates in particular, though not exclusively, to improvements to a threaded fastener suitable for fastening a grinding wheel, circular saw blade or carving disk and the like to the spindle of a power tool.

BACKGROUND TO THE INVENTION

Copending Australian Patent Application No. 85296/91 describes a threaded fastener suitable for securing a grinding wheel to the spindle of an angle grinder. The fastener comprises a first disk-shaped component having a first pressure transmitting surface adapted to bear against the grinding wheel, and a second disk-shaped component having a threaded hub non-rotatably fixed thereto. The first and second components are assembled on the hub so as to be rotatable with respect to each other, and the second component is adapted to apply an axially directed compressive force to press the first component against the grinding wheel when a torque is applied to the second component. A solid dry lubricant washer is provided between the first and second components in an annular recess immediately adjacent the hub, for reducing friction, when one of the components is rotated relative to the other. The lubricant washer insures that a significantly increased proportion of the torque applied to the second component is converted to compressive force transmitted through the first component to the grinding wheel.

While the performance of the above-described threaded fastener is entirely satisfactory and represents a great advance upon the art, the second component is typically of complex design and, as it normally carries the full clamping pressure of the nut, must be made from metal. This requires either a complex NC-machining process or the use of sintered powder metallurgy. It would be desirable if a part with such a complex shape could be made from plastics material by injection moulding or by die-casting. In practice, it has also proved difficult for a user to judge whether the fastener has been adequately tightened, due to the fact that the turning friction normally associated with tightening has been substantially eliminated. There is thus a danger of overtightening of the fastener.

SUMMARY OF THE INVENTION

The present invention was developed with a view to providing a number of improvements to the design of the above fastener.

According to one aspect of the present invention there is provided an improved fastener comprising:

first and second disc-shaped components assembled so as to be rotatable with respect to each other about a common axis, said first component having a pressure transmitting portion and a resilient flexing portion, said pressure transmitting portion being adapted to bear against an object to be fastened and being radially spaced from said common axis, said second component having a threaded portion provided in connection therewith and being adapted to apply an axially directed compressive force to press the pressure transmitting portion against said object when a torque is applied to said second component and wherein said flexing portion is adapted to allow the first component to flex when the pressure transmitting portion is pressed against said object so as to apply a clamping pressure to said object, said second component being provided with a recessed annulus within which said first component is rotatably received and wherein said recessed annulus is adapted to accommodate the flexing of the first component; and, a solid dry lubricant material having a low coefficient of friction provided between said first and second components to reduce friction therebetween when one of the components is rotated relative to the other whereby, in use, said solid dry lubricant material can ensure that a significantly increased proportion of the torque applied to said second component to fasten said object can be converted to said compressive force transmitted to the object through said pressure transmitting portion.

Preferably the improved fastener further comprises containment means provided in connection with said first and second components for containing said solid dry lubricant material therein whereby, in use, said solid dry lubricant material is capable of withstanding substantial compressive loads without being forced from between the first and second components.

Typically said pressure transmitting portion is in the form of an annular protrusion adapted to bear against the object to be fastened. Advantageously said recessed annulus has a radially inclined surface which faces a surface on the first disk-shaped component. Preferably said radially inclined surface of the second disk-shaped component forms a diminishing thickness dimension of the second disk-shaped component in a radially outwards direction.

Typically the second disk-shaped component is provided with a hub incorporating said threaded portion, said hub being received in an aperture provided in the first disk-shaped component whereby said first and second disk-shaped components share said common axis of rotation. Preferably said solid dry lubricant is in the form of a closed ring located concentrically between said disk-shaped components and typically lying immediately adjacent an outer periphery of said hub. Advantageously said hub has a shoulder and said first disk-shaped component is provided with an annular recess adapted to rotatably receive said shoulder therein, said annular recess having said dry lubricant ring contained therein, and wherein the height of said shoulder relative to the depth of said annular recess is selected so that said facing inclined surfaces of the components are normally separated by an air gap.

Preferably said improved fastener further comprises a seal ring Located between an outer periphery of said first component and an outer periphery of said recessed annulus for inhibiting the ingress of contaminants into the air gap between the components. The seal ring is preferably made from a solid dry lubricant material having a low coefficient of friction. Advantageously either one of said first and second components is provided with an annular lip for retaining said seal ring in place. In addition, the seal ring may have a resilient biasing spring, for example, a spring steel split-ring, for biasing the seal ring against the outer periphery of either said first component or said recessed annulus.

BRIEF DESCRIPTION OF THE DRAWINGS

In order to provide a more comprehensive understanding of the nature of the invention a preferred embodiment will now be described, by way of example only, with reference to the accompanying drawings in which;

FIG. 1 is a part section view through an embodiment of the improved fastener according to the invention;

FIG. 2 is similar to FIG. 1 and illustrates the fastener in use;

FIG. 5 illustrates a second embodiment of the improved fastener according to the invention; and, FIG. 6 illustrates a third embodiment of the improved fastener according to the invention.

DETAILED DESCRIPTION OF PREFERRED EMBODIMENTS

Figure 3:
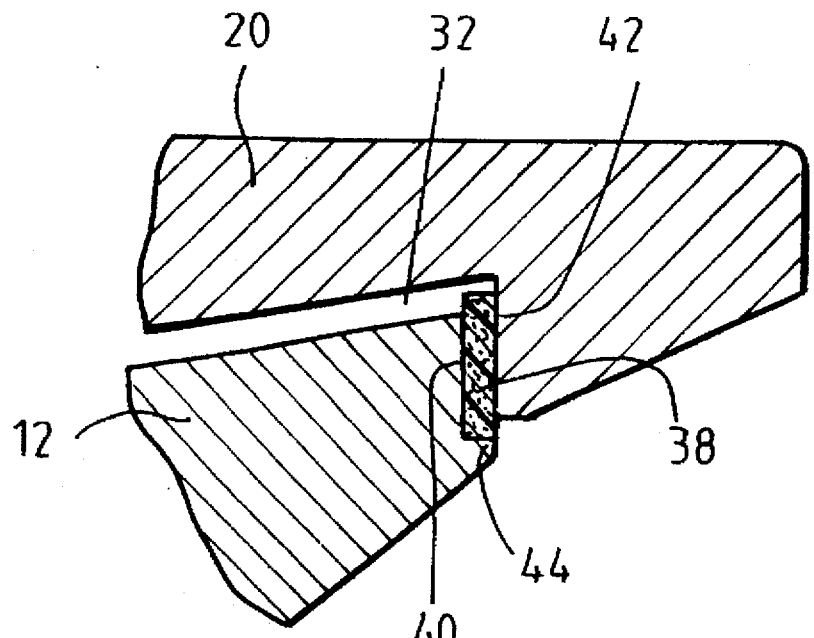
FIG. 3 is an enlargement of part of the fastener illustrated in FIG. 2.

A preferred embodiment of the improved fastener 10 according to the invention is illustrated in FIGS. 1 and 2. The fastener 10 comprises a first disk-shaped component 12 having a pressure transmitting portion 14 adapted to bear against an object to be fastened. In FIG. 2, the object to be fastened is a grinding disk 16 to be fastened to the spindle of an angle grinder (not illustrated). The pressure transmitting portion 14 of this embodiment is in the form of an annular protrusion which is radially spaced from a central axis of rotation 18 of the fastener 10.

The fastener 10 further comprises a second disk-shaped component 20 assembled with the first disk-shaped component so as to be rotatable with respect to each other about the common axis of rotation 18. The second disk-shaped component 20 is provided with a hub 22 non-rotatably fixed thereto and incorporating a threaded portion adapted to be threaded onto the spindle of the angle grinder. The second disk-shaped component 20 together with hub 22 is adapted to apply an axially directed compressive force to press the pressure transmitting portion 14 of the first disk-shaped component 12 against the object, when a torque is applied to the second component 20. A flap 30 is provided, that can be pivoted to lie substantially parallel to axis 18, for applying a torque manually to the second component 20.

Advantageously, the first component 12 is adapted flex when the pressure transmitting portion 14 is pressed against the object to be fastened. The first component 12 is preferably designed to have a reducing thickness dimension or taper in a radially inwards direction, so that it has a minimum thickness immediately adjacent hub 22. Hence, when a load is applied proximate the centre of the first component 12 it is able to flex or bend at the thinnest point. The material of the first component 12 is selected to be resilient, for example, spring steel or a resilient plastics material, so that when the load is released it returns to its original shape. This is illustrated most clearly in FIG. 2, where it can be seen that an air gap between the first component 12 and the second component 20 has been reduced compared with FIG. 1, as a compressive load is applied to the first component 12. The air gap between the first and second components is typically between 1.0 to 1.5 mm wide. A bending moment is produced in the first component 12 at the point of contact of pressure transmitting portion 14 with the grinding disk 16. The degree of flex of the first component 12 is partly determined by the resilience and thickness of the first component 12. This will vary for different sized fasteners designed for various applications.

The principal advantages of designing the first component 12 so that it can flex when an axially directed compressive force is applied thereto, are as follows:

(1) The first disk-shaped component 12 acts as a spring and the spring force generated when it flexes provides additional pre-loading on the spindle of the angle grinder to maintain sufficient frictional contact between the grinding disk and the backing plate;

(2) The subjective "feel" of the fastener is improved, due to the degree of "give" provided by the flexing of the first component 12 which helps the user judge how much clamping pressure is being applied;

(3) It helps to avoid overloading of the grinding disk due to overtightening of the fastener;

(4) There is a degree of mechanical advantage obtained due to the spaced location of the annular protrusion 14 from the central axis of rotation 18, and more particularly from the thread of hub 22; and, (5) In view of (4) above, the grinding disk 16 can be held more securely against the backing plate provided on the spindle of the angle grinder as the load is applied primarily at a location spaced outwardly from the centre of the disk, which is the preferred location. Furthermore, it is known that stress fractures are most likely to form immediately adjacent the central aperture in the grinding disk. Hence, by applying the clamping pressure radially spaced from the central aperture the stresses in the disk can be reduced and the disk is less likely to fly off the spindle in the event of failure.

As a load is applied to the grinding disk 16 via pressure transmitting portion 14, the first component 12 may flex sufficiently for the centre region of the first component 12 to come into contact with the disk 16 adjacent its central aperture. The first component 12 typically flexes to produce from between 0.5 to 1.0 mm of travel. The pressure transmitted to the disk 16 adjacent its central aperture may provide additional hold down pressure. However in most applications this is undesirable as it diminishes the mechanical advantage and improved clamping pressure noted in (4) and (5) above. The spring force in the first disk-shaped component 12 is preferably sufficient to provide adequate clamping pressure, (via annular protrusion 14 when flexed between 0.5 to 1.0 mm), without bottoming out.

In some applications, for example, when fastening a saw blade or rotary cutter which are not as thick as grinding disks, it is possible that hub 22 may come into contact with the backing plate on the angle grinder. Normally, one would simply change the backing plate to suit the application. However, if desired, the protruding end of hub 22 may be provided with a solid dry lubricant washer or bearing arrangement to reduce the friction between the end of the hub and the backing plate.

Similar to the fastener of PCT/AU91/00420, the improved fastener 10 further comprises a solid dry lubricant material having a low co-efficient of friction provided between the first and second components to reduce friction therebetween when one of the components is rotated relative to the other. In this embodiment the solid dry lubricant is in the form of a closed ring or washer 24 located concentrically between the disk-shaped components 12, 20 and lying immediately adjacent an outer periphery of the hub 22. Clearly the solid dry lubricant may take any suitable form, for example, a series of radially extending sections. The solid dry lubricant washer 24 ensures that a significantly increased proportion of the torque applied to the second component 20 is converted to a compressive force transmitted to the grinding disk 16 through the pressure transmitting portion 14. It also overcomes the problem of overtightening caused by slipping of the grinding disk, and it enables the fastener to be tightened and loosened by hand.

In this embodiment, hub 22 is provided with a shoulder 26 defined between an upper larger diameter portion 25 and a lower smaller diameter portion 27 of the hub 22, and the first component 12 is provided with an annular recess 28 adapted to rotatably receive the shoulder 26 therein. Annular recess 28 has the lubricant washer 26 located therein. Either one or both of annular recess 28 and shoulder 26 may be manufactured from stainless steel to provide a smooth pressure transmitting surface that bears against washer 24. The hub 22 and annular recess 28 effectively contain the solid dry lubricant material therein so that, in use, the washer 24 is capable or withstanding substantial compressive loads without being forced from between the first and second components 12, 20. The first and second components are accurately fitted to hub 22 to ensure concentric rotation. The height of the shoulder 26, the depth of annular recess 28 and the thickness of washer 24 are selected so that the facing inclined surfaces of the disk-shaped components are normally separated by an air gap. Ideally the hub 22 has a minimum wall thickness in the region of the smaller diameter portion 27. Thus, for example, with an angle grinder spindle outside diameter of 14 mm, the outside diameter of the portion 27 is approximately 17 mm. The first disk-shaped component 12 is retained on the portion 27 of hub 22 by any suitable means, in this case a retaining ring 29 shrink-fitted to portion 27.

In the illustrated embodiment, the second component 20 does not have any pressure transmitting surfaces provided directly thereon, the only pressure transmitting surface provided in connection therewith being that provided on shoulder 26 of the hub 22. Hub 22 is typically manufactured separately from the second component 20 and the outer surface of portion 25 is formed with splines (not illustrated) which engage with corresponding internal splines on the second disk-shaped component 20. The second disk-shaped component 20 is therefore provided purely to enable a torque to be applied to hub 22 and no facilitate manual tightening and loosening of the fastener by means of a gripping device in the form of flap 30, similar to that described in PCT/AU91/00420.

A significant advantage of providing the pressure transmitting surface of the second component on hub 22 is that the fastener then fully complies with Australian Standards specifications, in which the threaded part of a fastener should hold down the washer for safety reasons. Therefore, even if the disk-shaped component 20 should become separated from hub 22, the fastener will remain securely fastened to the spindle of the angle grinder. A further significant advantage is that the second disk-shaped component can be manufactured from a suitable plastics material by injection moulding. This greatly simplifies and reduces the cost of manufacturing the second disk-shaped component 20 which is of relatively complex shape to accommodate a pivotable connection of flap 30.

The second disk-shaped component 20 of this embodiment is provided with a recessed annulus 32 within which the first disk-shaped component 12 is rotatably received. Recessed annulus 32 is provided with a radially inclined surface 34 which faces a matching radially inclined surface 36 on the first component 12. The angle of inclination of surface 36 is different from that of surface 34 in order to provide an enlarged air gap to accommodate the flexing of the first component 12. Furthermore, radially inclined surface 34 forms a diminishing thickness dimension of the second component 20 in a radially outwards direction. This is advantageous in so far as it enables a maximum thickness dimension to be maintained adjacent the hub where maximum strength of the second component 20 is required, both to ensure the integrity of the connection with hub 22 and to accommodate a groove (not illustrated) within which the hinge connection of flap 30 is provided.

In order to inhibit the ingress of contaminants into the air gap between the first and second components 12, 20, a seal ring 38 is located between an outer periphery 40 of the first component 12 and an outer periphery 42 of the recessed annulus 32. The seal ring 38 is preferably made from a solid dry lubricant material having a low coefficient of friction, similar to that of the lubricant washer 24. It is desirable that the material of seal ring 38 have the lowest possible coefficient of friction so that its presence between the outer peripheries 40, 42 causes minimum friction therebetween. The configuration of the seal ring 38 is illustrated more clearly in FIG. 3, which is an enlargement of the part of the fastener circled in FIG. 2. In this embodiment, the outer periphery 40 of the first component 12 is provided with an annular lip 44 for retaining the seal ring 38 in place. Advantageously, the seal ring 38 may have a resilient biasing spring, (not illustrated), for example, a spring steel split-ring, for biasing the seal ring against the outer periphery of the first component 12 or recessed annulus 32. This may be desirable to maintain a seating fit of the seal ring 38 if the material of the seal ring is not itself capable of holding its original shape, ie, if it is not resilient.

The solid dry lubricant material of washer 24 and seal ring 38 is typically a fluoropolymer plastic having a low coefficient of friction such as PTFE, commonly known as teflon. Advantageously, the teflon may be reinforced with a filler material such as ground glass in order to improve its compressibility.

Figure 4:
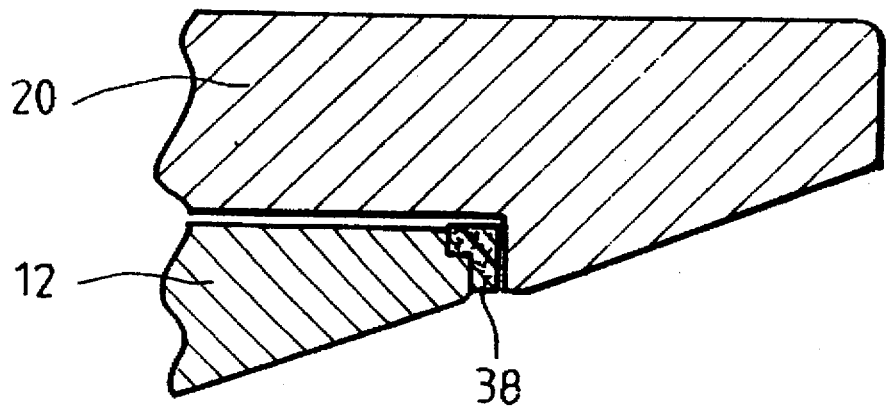
FIG. 4 is a variation of the part illustrated in FIG. 3.

FIG. 4 illustrates a variation of the arrangement of the seal ring 38 between the first and second components 12, 20 respectively. In this embodiment, the seal ring 38 is profiled to fit beneath a lip provided on the outer periphery of the first component 12.

FIGS. 5 and 6 illustrate second and third embodiments of the improved fastener respectively in which parts having the same or similar function are given the same reference numerals as the embodiment of FIGS. 1 and 2. The fastener in FIG. 5 is shown in exploded or disassembled form. As before the first component 12 is provided with an annular recess 28 to accommodate the washer 24 (and to prevent its distortion or extrusion under pressure). However, the first component 12 of this embodiment is also provided with a second annular recess 48 on the underside for containing a second low-friction washer 50. A bow spring-steel or bronze washer 52 is fitted in recess 28 under washer 24 to keep it in firm contact with shoulder 26, and a similar spring washer 54 is fitted under low-friction washer 50 to keep it firmly located in recess 48.

It will be appreciated that when the device of FIG. 5 is assembled like that of FIG. 1, the upper load-bearing faces of low-friction washers 24 and 50 are kept in firm contact with shoulder 26 and the first component 12 respectively so that grit and dirt are excluded.

Another modification to the fastener of this embodiment is in the shape of the first component 12, which is dished so that the undersurface is concave. Hence, when the fastener presses against the grinding disk (not illustrated in FIG. 5) or other tool element, the only part of the fastener that is in pressure-transmitting contact with the disk is a pressure transmitting portion 14 proximate the outer periphery of the facing surface of the first disk-shaped component 12. The outer periphery of the first disk-shaped component 12 is formed with an annular protrusion 14. The first component 12 is adapted to flex in a similar manner to that of the first embodiment when the pressure transmitting portion is pressed against the grinding disk.

The third embodiment of FIG. 6 is similar to that of FIG. 5 except that the first component 12 is formed as a disk-like spring plate, the outer periphery 14 of which bears against the outer face of the grinding disk 16 and acts as the pressure transmitting portion of component 12. Preferably, for reasons made clear in the second embodiment described above, a coil-spring or helical spring washer 56 is located under the inner face of the spring plate 12 so as to bear against the retaining ring 29 and bias the spring-plate against the low-friction washer 24 no exclude grit and dirt from its load-bearing interfaces.

Now that preferred embodiments of the improved fastener have been described in detail it will be apparent that numerous variations and modifications can be made, in addition to these already described, without departing from the basic inventive concepts. For example, the hub 22 need not be manufactured separately from the second component 20 but may be manufactured integral thereto. Furthermore, the first and second components 12, 20 need not be disk-shaped, this shape being merely preferred for ease of manufacture and for aesthetic reasons. Also, the improved fastener is not limited in application to power tools, it can be used in any situation where it is desirable to be able to convert a higher percentage of the applied torque to compressive force. All such variations and modifications as would occur to a person skilled in the mechanical arts are to be considered within the scope of the present invention, the nature of which is to be determined from the foregoing description and the appended claims.

I claim:

1. An improved fastener, comprising:

first and second disk-shaped components assembled so as to be rotatable with respect to each other about a common axis, said first component having a pressure transmitting portion and a resilient flexing portion, said pressure transmitting portion being adapted to bear against an object to be fastened and being radially spaced from said common axis, said second component having a threaded portion adapted to apply an axially directed compressive force to said second component to press the pressure transmitting portion of said first component against said object when a torque is applied to thread said second component and wherein said flexing portion is adapted to allow the first component to flex when the pressure transmitting portion is pressed against said object so as to apply a clamping pressure to said object, said second component being provided with a recessed annulus within which said first component is rotatably received and wherein said recessed annulus is adapted to accommodate the flexing of the first component;

a solid dry lubricant material having a low coefficient of friction provided between said first and second components to reduce friction therebetween when one of the components is rotated relative to the other whereby, in use, said solid dry lubricant material can ensure that a significantly increased proportion of the torque applied to said second component to fasten said object can be converted to said compressive force transmitted to the object through said pressure transmitting portion; and a containment means provided in connection with said first and second components for containing said solid dry lubricant material therein whereby, in use, said solid dry lubricant material is capable of withstanding substantial compressive loads without being forced from between the first and second components.

2. A fastener as claimed in claim 1, wherein said pressure transmitting portion is in the form of an annular protrusion adapted to bear against the object to be fastened.

3. A fastener as claimed in claim 2, wherein said recessed annulus has a radially inclined surface which faces a surface on the first disk-shaped component.

4. A fastener as claimed in claim 1, wherein said first disk-shaped component is dished and wherein an outer peripheral portion on a concave surface of said first disk-shaped component forms said pressure transmitting portion.

5. A fastener as claimed in claim 4, wherein said outer periphery is formed with an annular protrusion.

6. A fastener as claimed in claim 1, wherein the second disk-shaped component is provided with a hub incorporating said threaded portion, said hub being rotatably received in a concentric aperture provided in the first disk-shaped component whereby said first and second disk-shaped components share said common axis of rotation.

7. A fastener as claimed in claim 6, wherein said solid dry lubricant material is in the form of a closed ring located concentrically between said disk-shaped components and lying immediately adjacent an outer periphery of said hub.

8. A fastener as claimed in claim 7, wherein said hub has a larger diameter portion and a smaller diameter portion defining a shoulder therebetween and said first and second disk-shaped components form an annular recess therebetween having said solid dry lubricant ring contained therein, said shoulder bearing on the solid dry lubricant ring in said annular recess, and wherein the depth of said annular recess is selected so that said facing surfaces of the components are normally separated by an air gap.

9. A fastener as claimed in claim 8, further comprising a seal ring located between an outer periphery of said first component and an outer periphery of said recessed annulus for inhibiting the ingress of contaminants into the air gap between the components.

10. A fastener as claimed in claim 9, wherein the seal ring is made from a solid dry lubricant material having a low coefficient of friction.

11. A fastener as claimed in claim 8 wherein a spring member is provided to retail the solid dry lubricant ring in firm contact with said shoulder whereby, in use, grit and dirt can be excluded.

* * * * *